United States Patent [19]

Sabin et al.

[11] Patent Number: 4,901,535

[45] Date of Patent: Feb. 20, 1990

[54] TEMPERATURE CHANGING DEVICE IMPROVED EVAPORATION CHARACTERISTICS

[76] Inventors: Cullen M. Sabin, 3346 Ullman St., San Diego, Calif. 92109; Dennis A. Thomas, 20131 Allentown Dr., Los Angeles, Calif. 91364; Gary Steidl, 1730 S. El Camino Real, Apt. H-208, Encinitas, Calif. 92024

[21] Appl. No.: 208,371

[22] Filed: Jun. 22, 1988

Related U.S. Application Data

[63] Continuation-in-part of Ser. No. 70,973, Jul. 7, 1987, Pat. No. 4,759,191, which is a continuation-in-part of Ser. No. 169,869, Mar. 17, 1988.

[51] Int. Cl.$^4$ .............................................. F25B 15/00
[52] U.S. Cl. ......................................... 62/101; 62/480
[58] Field of Search ............... 62/480, 477, 494, 235, 62/476, 106, 502, 294, , 101; 237/2 B, 213

[56] References Cited

U.S. PATENT DOCUMENTS

| | | |
|---|---|---|
| 1,669,269 | 5/1928 | Von Platen et al. ............. 62/494 X |
| 2,144,441 | 1/1939 | Schlumbohm ........................ 62/106 |
| 3,316,736 | 5/1967 | Biermann . |
| 3,642,059 | 2/1972 | Greiner . |
| 3,726,106 | 4/1973 | Jaeger . |
| 3,950,960 | 4/1976 | Kawam . |
| 3,967,465 | 7/1976 | Asselman et al. . |
| 3,970,068 | 7/1976 | Sato . |
| 4,126,016 | 11/1978 | Greiner . |
| 4,205,531 | 6/1980 | Bruenberg . |
| 4,250,720 | 2/1981 | Siegel . |
| 4,682,476 | 7/1987 | Payre et al. ...................... 62/477 X |
| 4,736,599 | 4/1988 | Siegel . |

FOREIGN PATENT DOCUMENTS 2095386 9/1982 United Kingdom .

*Primary Examiner*—Henry A. Bennet
*Assistant Examiner*—John Sollecito
*Attorney, Agent, or Firm*—Knobbe, Martens, Olson & Bear

[57] ABSTRACT

Disclosed is a self-contained, rapid cooling device that can be stored for indefinite periods without losing its cooling potential. A liquid in a first chamber undergoes a change of phase into vapor which cools the first chamber. A sorbent in a second chamber is in fluid communication with the vapor and removes the vapor from the first chamber. The cooling process is facilitated by providing the interior surface of the first chamber with a wicking material to retain the largest possible contact between the liquid and the first chamber as the level of the liquid lowers during the vaporization process. A phase separator and a porous space-filling wick prevent unvaporized liquid from passing into the second chamber.

9 Claims, 1 Drawing Sheet

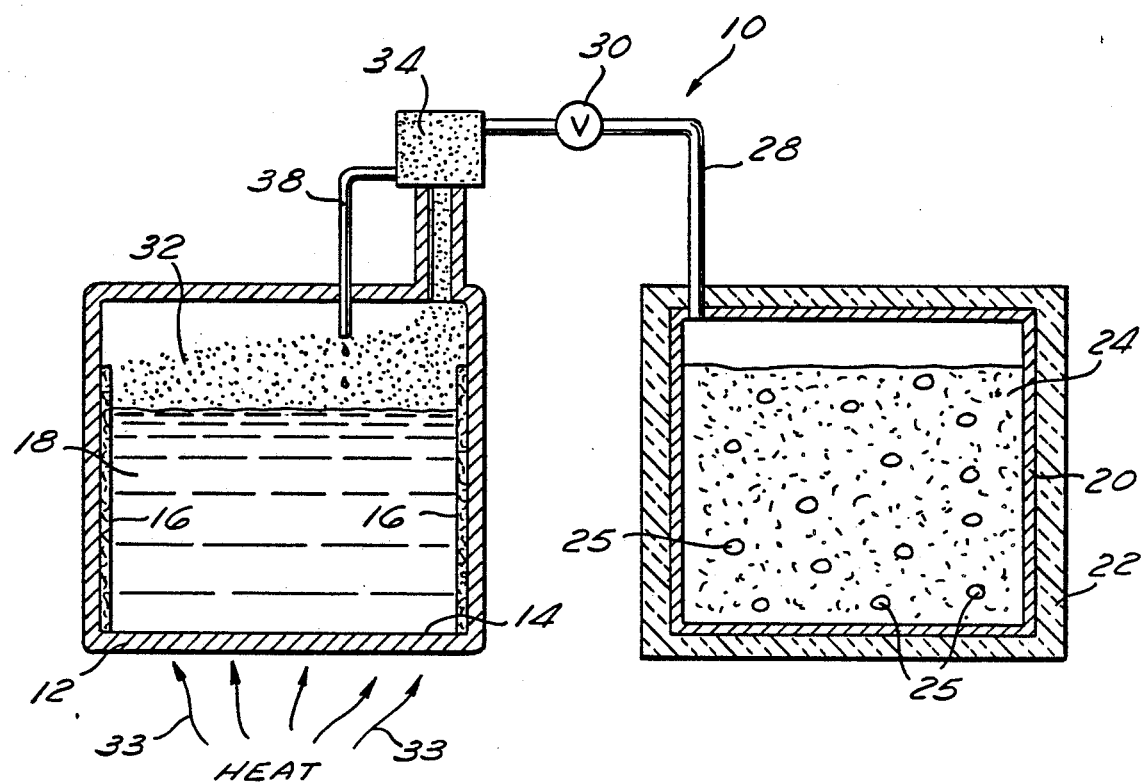

TEMPERATURE CHANGING DEVICE IMPROVED EVAPORATION CHARACTERISTICS

RELATED APPLICATIONS

This application is a continuation-in-part of our co-pending applications, Ser. No. 070,973, now U.S. Pat. No. 4,759,191 filed July 7, 1987, and Ser. No. 169,869, filed Mar. 17, 1988.

BACKGROUND OF THE INVENTION

The invention relates to temperature changing devices and, in particular, to portable or disposable food or beverage coolers.

There are many foods and beverages that may be stored almost indefinitely at average ambient temperature of 20°–25° C. but that should be cooled immediately before consumption. In general, the cooling of these food and beverages is accomplished by electrically-run refrigeration units. The use of these units to cool such foods and beverages is not always practical because refrigerators generally require a source of electricity, they are not usually portable, and they do not cool the food or beverage quickly.

An alternate method for providing a cooled material on demand is to use portable insulated containers. However, these containers function merely to maintain the previous temperature of the food or beverage placed inside them, or they require the use of ice cubes to provide the desired cooling effect. When used in conjunction with ice, insulated containers are much more bulky and heavy than the food or beverage. Moreover, in many locations, ice may not be readily available when the cooling action is required.

Ice cubes have also been used independently to cool food or beverages rapidly. However, utilization of ice independently for cooling is often undesirable because ice may be stored only for limited periods above 0° C. Moreover, ice may not be available when the cooling action is desired.

In addition to food and beverage cooling, there are a number of other applications for which a portable cooling device is extremely desirable. These include medical applications, including cooling of tissues or organs; preparation of cold compresses and cryogenic destruction of tissues as part of surgical procedures; industrial applications, including production of cold water or other liquids upon demand; preservation of biological specimens; cooling of protective clothing; and cosmetic applications. A portable cooling apparatus could have widespread utility in all these areas.

Most attempts to build a self-contained miniaturized cooling device have depended on the use of a refrigerant liquid stored at a pressure above atmospheric pressure, so that the refrigerant vapor could be released directly to the atmosphere. Unfortunately, many available refrigerant liquids for such a system are either flammable, toxic, harmful to the environment, or exist in liquid form at such high pressures that they represent an explosion hazard in quantities suitable for the intended purpose. Conversely, other available refrigerant liquids acceptable for discharge into the atmosphere (such as carbon dioxide) have relatively low heat capacities and latent heats of vaporization. As a result, some cooling devices which release carbon dioxide are more bulky than is commercially acceptable for a portable device.

An alternate procedure for providing a cooling effect in a portable device is to absorb or adsorb the refrigerant vapor in a chamber separate from the chamber in which the evaporation takes place. In such a system, the refrigerant liquid boils under reduced pressure in a sealed chamber and absorbs heat from its surroundings. The vapor generated from the boiling liquid is continuously removed from the first chamber and discharged into a second chamber containing a desiccant or sorbent that absorbs the vapor.

The use of two chambers to produce a cooling effect around one chamber is illustrated in U.S. Pat. No. 4,250,720 to Siegel and Great Britain Pat. No. 2,095,386 to Cleghorn, et al. These patents disclose a two-chamber apparatus connected by a tube. The Siegel patent uses water as the refrigerant liquid, while the Cleghorn, et al. patent is not limited to water. The Siegel patent envisions the use of such a cooling device to cool food or beverages.

However, in both the Siegel and Cleghorn, et al. patents, the rapid initial cooling effect gradually slows as a result of the both decrease in temperature of the object to be cooled and decrease in the heat transfer area of the first chamber. The decrease in heat transfer area is due to the fact that the portion of the first chamber in contact with the liquid decreases as the liquid vaporizes and the liquid level drops. Moreover, in these systems, the evaporation process is limited by the surface area from which the liquid can boil. In addition, the systems do not effectively minimize the amount of liquid which is entrained in the vapor phase caused by uncontrolled boiling of the evaporating liquid.

Accordingly, one objective of the present invention is to provide a self-contained sorption cooling device with a means to alleviate the decrease in heat transfer as the liquid vaporizes and therefore speed the cooling process.

Another object of the present invention is to accelerate the evaporation process by increasing the surface area from which the liquid can evaporate. As a result, the cooling process will be accelerated as well.

Another object of the present invention is to control the evaporation process by limiting liquid entrainment in the vapor phase.

Other objectives will become apparent from the appended drawing and the following Detailed Description of the Invention.

SUMMARY OF THE INVENTION

The present invention is a miniaturized cooling device comprising a first chamber containing a liquid which preferably has a vapor pressure at 20° C. of at least about 9 mm Hg, a second chamber containing a sorbent for the liquid, a conduit connecting the first and second chambers, a valve in the conduit for preventing flow through the conduit between the chambers and means for opening the valve. The second chamber is initially evacuated. Thus, when the valve is opened, the first and second chambers are connected and fluid communication between them is possible. This causes a drop in pressure in the first chamber because the second chamber is evacuated. The drop in pressure causes the liquid in the first chamber to vaporize, and, because this liquid-to-gas phase change can occur only if the liquid removes heat equal to the latent heat of vaporization of the evaporated liquid from the first chamber, the first chamber cools. The vapor passes through the conduit and into the second chamber where it is absorbed and adsorbed by the sorbent. The sorbent also absorbs all of the heat contained in the absorbed or adsorbed vapor, and, if the absorption-adsorption process involves a chemical reaction, the sorbent must also absorb the reaction heat.

In a preferred embodiment, the liquid is water, and the first chamber's interior surface may be provided with a wicking material for the liquid. It is preferred that the wicking material lines the interior surface of the first chamber and consists of a highly hydrophilic material, such as gel-forming polymers and water-wicking polymers capable of coating the interior of the first chamber.

In one embodiment of the invention, the liquid is mixed with a nucleating agent that promotes ebullition of the liquid. A phase separator for preventing unvaporized liquid from the first chamber from passing through the conduit into the second chamber may advantageously be included in the device. The sorbent material may be an adsorbent or absorbent, and the second chamber preferably contains sufficient sorbent to absorb or adsorb substantially all of the liquid in the first chamber. The entire device is preferably disposable.

In use, the vaporization process causes the level of the liquid in the first chamber to drop, but, in the preferred embodiment, the wicking material retains the liquid on the interior surface of the first chamber. This maintains a substantial area of contact between the liquid and the interior surface of the first chamber to avoid a reduction in the effective heat transfer area of the first chamber and a resultant slowing of the cooling process.

The present invention provides a self-contained rapid cooling device that cools a food, beverage, or other material or article from ambient temperature on demand in a timely manner, exhibits a useful change in temperature, retains the heat produced from the cooling process or retards the transfer of heat from the sorbent back to the material being cooled, can be stored for unlimited periods without losing its cooling potential, and is able to meet government standards for safety in human use.

BRIEF DESCRIPTION OF THE DRAWINGS

The figure is a schematic representation of a cooling device according to the present invention.

DETAILED DESCRIPTION OF THE INVENTION

In FIG. 1, the cooling device 10 has a first chamber 12 lined on the interior surface 14 with a wicking material 16, which, in a preferred embodiment, could be accomplished by flocking or spraying the interior surface 14 with the wicking material 16, and the first chamber 12 is filled with a refrigerant liquid 18. The cooling device 10 also includes a second chamber 20 surrounded by a thermal insulator 22 which is at least partially filled with a sorbent 24. The second chamber may also advantageously be evacuated to the extent that it contains only the vapor of the refrigerant liquid.

Connecting the first and second chambers 12 and 20 is a conduit 28 and a valve 30 interposed in the conduit 28, allowing fluid communication between the chambers 12 and 20 through the conduit 28 only when the valve 30 is open.

The operation of the cooling device 10 is suspended (i.e., the system is static and no cooling occurs) until the valve 30 is opened, at which time the conduit 28 provides fluid communication between the first and second chambers 12 and 20. Opening the valve 30 between the first and second chambers 10 and 20 causes a drop in pressure in chamber 12 because the second chamber 20 is evacuated. The drop in pressure in the first chamber 12 upon opening of the valve 30 causes the liquid 18 to boil at ambient temperature into a liquid-vapor mixture 32. This liquid-to-gas phase change can occur only if the liquid 18 removes heat equal to the latent heat of vaporization of the evaporated liquid 18 from the first chamber 12. This causes the first chamber 12 to cool. The cooled first chamber 12, in turn, removes heat from its surrounding material as indicated by the arrows 33.

The liquid-vapor mixture 32 is directed through a liquid-vapor collector and separator 34 of conventional design, which separates the liquid 18 from the vapor, allowing the separated liquid 18 to return to the first chamber 12 through the liquid return line 38 and allowing the vapor to pass through the conduit 28 into the second chamber 20. Once inside the second chamber 20, the vapor is absorbed or adsorbed by the sorbent 24. This facilitates the maintenance of a reduced vapor pressure in the first chamber 12 and allows more of the liquid 18 to boil and become vapor, further reducing the temperature of chamber 12. The continuous removal of the vapor maintains the pressure in the first chamber 12 below the vapor pressure of the liquid 18, so that the liquid 18 boils and produces vapor continuously until sorbent 24 is saturated, until the liquid 18 has boiled away or until the temperature of the liquid 18 has dropped below its boiling point.

During the vaporization process, the level of the liquid 18 in the first chamber 12 drops. The wicking material 16 retains the liquid 18 on the interior surface 14 of the first chamber 12 to prevent a reduction in the area of contact between the liquid 18 and the interior surface 14 which would cause a reduction in the effective heat transfer surface area of the first chamber 12 and would thus slow the cooling process.

Three important components of the present invention are the evaporating liquid, the sorbent, and the wicking material. The liquid and the sorbent must be complimentary (i.e., the sorbent must be capable of absorbing or adsorbing the vapor produced by the liquid), and suitable choices for all three of these components would be any combination able to make a useful change in temperature in a short time, meet government standards for safety, and be compact.

The refrigerant liquids used in the present invention preferably have a high vapor pressure at ambient temperature, so that a reduction of pressure will produce a high vapor production rate. The vapor pressure of the liquid at 20° C. is preferably at least about 9 mm Hg, and more preferably is at least about 15 or 20 mm Hg. Moreover, for some applications (such as cooling of food products), the liquid should conform to applicable government standards in case any discharge into the surroundings, accidental or otherwise, occurs. Liquids with suitable characteristics for various uses of the invention include: various alcohols, such as methyl alcohol and ethyl alcohol; ketones or aldehydes, such as acetone and acetaldehyde; water; and freons, such as freon C318, 114, 21, 11, 114B2, 113 and 112. The preferred liquid is water.

In addition, the refrigerant liquid may be mixed with an effective quantity of a miscible nucleating agent having a greater vapor pressure than the liquid to promote ebullition so that the liquid evaporates even more quickly and smoothly, and so that supercooling of the liquid does not occur. Suitable nucleating agents include ethyl alcohol, acetone, methyl alcohol, propyl alcohol and isobutyl alcohol, all of which are miscible with water. For example, a combination of a nucleating agent with a compatible liquid might be a combination of 5% ethyl alcohol in water or 5% acetone in methyl alcohol. The nucleating agent preferably has a vapor pressure at 25° C. of at least about 25 mm Hg and, more preferably, at least about 35 mm Hg. Alternatively, solid nucleating agents may be used, such as the conventional boiling stones used in chemical laboratory applications.

The sorbent material used in the second chamber 20 is preferably capable of absorbing and adsorbing all the vapor produced by the liquid, and also preferably will meet government safety standards for use in an environment where contact with food may occur. Suitable sorbents for various applications may include barium oxide, magnesium perchlorate, calcium sulfate, calcium oxide, activated carbon, calcium chloride, glycerine, silica gel, alumina gel, calcium hydride, phosphoric anhydride, phosphoric acid, potassium hydroxide, sulphuric acid, lithium chloride, ethylene glycol and sodium sulfate.

In selecting the wicking material 16, any of a number of materials may be chosen, depending upon the requirements of the system and the particular refrigerant liquid 18 being used. The wicking material may be something as simple as cloth or fabric having an affinity for the refrigerant liquid 18 and a substantial wicking ability. Thus, for example, when the refrigerant liquid is water, the wicking material may be cloth, sheets, felt or flocking material which may be comprised of cotton, filter material, natural cellulose, regenerated cellulose, cellulose derivatives, blotting paper or any other suitable material.

The most preferred wicking material would be highly hydrophilic, such as gel-forming polymers which would be capable of coating the interior surface of the evaporation chamber. Such materials preferably consists of alkyl, aryl and amino derivative polymers of vinylchloride acetate, vinylidene chloride, tetrafluoroethylene, methyl methacrylate, hexanedoic acid, dihydro-2,5-furandione, propenoic acid, 1,3-isobenzofurandione, 1 h-pyrrole-2,5-dione or hexahydro-2 h-azepin-2-one.

The wicking material may be sprayed, flocked, or otherwise coated or applied onto the interior surface of the first chamber. In a preferred embodiment, the wicking material is electrostatically deposited onto that surface. In another embodiment, the wicking material is mixed with a suitable solvent, such as a non-aqueous solvent, and then the solution is applied to the interior surface of the first chamber.

In another preferred embodiment, the wicking material is able to control any violent boiling of the evaporator and thus reduce any liquid entrainment in the vapor phase. In such an embodiment, the wicking material is a polymer forming a porous space-filling or sponge-like structure, and it may fill all or part of the first chamber.

The thermal insulator 22 may be any conventional insulation material, but is preferably an inexpensive, easily-formed material such as a low-cost polystyrene foam.

The valve may be selected from any of the various types shown in the prior art.

The invention also includes a method of using the cooling device described herein. This method includes the step of providing a cooling device of the type set forth herein; opening the valve between the first chamber 12 and the second chamber 20, whereby the pressure in the first chamber is reduced, causing the liquid to boil, forming a vapor, which vapor is collected by the sorbent material; and removing vapor from the second chamber by collecting the same in the sorbent until an equilibrium condition is reached wherein the sorbent is substantially saturated or substantially all of the liquid originally in the first chamber has been collected in the sorbent. The process is preferably a one-shot process; thus, opening of the valve 30 in the conduit 28 connecting the first chamber 12 and the second chamber 20 is preferably irreversible. At the same time, the system is a closed system; in other words, the refrigerant liquid does not escape the system, and there is no means whereby the refrigerant liquid or the sorbent may escape either the first chamber 12 or the second chamber 20.

Although the invention has been described in the context of certain preferred embodiments, it is intended that the scope of the invention not be limited to the specific embodiment set forth herein, but instead be measured by the claims that follow.

What is claimed is:

1. A self-contained cooling apparatus, comprising:
   a first chamber containing a liquid wherein said first chamber has an interior surface provided with a wicking material for said liquid;
   a second evacuated chamber containing a sorbent for said liquid;
   a conduit connecting said first and second chambers
   a valve in said conduit for preventing flow through said conduit between said chambers; and
   an actuator for opening said valve to connect said first and second chambers, permitting said liquid to vaporize and permitting said vapor to pass through said conduit and into said sorbent, whereby the evaporation of said liquid serves to cool said first chamber wherein said wicking material for said liquid comprises a hydrophilic gel-forming polymer.

2. A self-contained cooling apparatus, comprising:
   a first chamber containing a liquid wherein said first chamber has an interior surface provided with a wicking material for said liquid wherein said wicking material for said liquid comprises a hydrophilic gel forming polymer, wherein said wicking material for said liquid consists of alkyl, aryl and amino derivative polymers selected from the group comprising vinylchloride acetate, vinylidene chloride, tetrafluoroethylene, methyl methacrylate, hexanedoic acid, dihydro-2,5-furandione, propenoic acid, 1,3-isobenzofurandione, 1 h-pyrrole-2,5-dione and hexahydro-2 h-azepin-2-one;
   a second evacuated chamber containing a sorbent for said liquid;
   a conduit connecting said first and second chambers;
   a valve in said conduit for preventing flow through said conduit between said chambers; and
   an actuator for opening said valve to connect said first and second chambers, permitting said liquid to vaporize and permitting said vapor to pass through said conduit and into said sorbent, whereby the evaporation of said liquid serves to cool said first chamber.

3. A self-contained cooling apparatus, comprising:

a first chamber containing a liquid wherein said first chamber has an interior surface provided with a wicking material for said liquid, wherein the first chamber has been provided with electrostatic charge means to adhere the wicking material to the interior surface of said first chamber, said wicking material lining the interior surface of said first chamber;

a second evacuated chamber containing a sorbent for said liquid;

a conduit connecting said first and second chambers;

a valve in said conduit for preventing flow through said conduit between said chambers; and an actuator for opening said valve to connect said first and second chambers, permitting said liquid to vaporize and permitting said vapor to pass through said conduit and into said sorbent, whereby the evaporation of said liquid serves to cool said first chamber.

4. A self-contained cooling apparatus, comprising:

a first chamber containing a liquid wherein said first chamber has an interior surface provided with a wicking material for said liquid;

a second evacuated chamber containing a sorbent for said liquid;

a conduit connecting said first and second chambers;

a valve in said conduit for preventing flow through said conduit between said chambers;

an actuator for opening said valve to connect said first and second chambers, permitting said liquid to vaporize and permitting said vapor to pass through said conduit and into said sorbent, whereby the evaporation of said liquid serves to cool said first chamber; and a nucleating material having a vapor pressure at 25° C. of above about 25 mm Hg in said first chamber to facilitate boiling of said liquid when the pressure in said first chamber drops as a result of opening said valve.

5. A self-contained cooling apparatus, comprising:

a first chamber containing a liquid wherein said first chamber has an interior surface provided with a wicking material for said liquid;

a second evacuated chamber containing a sorbent for said liquid;

a conduit connecting said first and second chambers;

a valve in said conduit for preventing flow through said conduit between said chambers;

an actuator for opening said valve to connect said first and second chambers, permitting said liquid to vaporize and permitting said vapor to pass through said conduit and into said sorbent, whereby the evaporation of said liquid serves to cool said first chamber, and a nucleating material having a vapor pressure at 25° C. of above about 25 mm Hg in said first chamber to facilitate boiling of said liquid when the pressure in said first chamber drops as a result of opening said valve, wherein said nucleating material is ethyl alcohol, acetone, methyl alcohol, propyl alcohol or isobutyl alcohol.

6. A self-contained cooling apparatus, comprising:

a first chamber containing a liquid wherein said first chamber has an interior surface provided with a wicking material for said liquid;

a second evacuated chamber containing a sorbent for said liquid;

a conduit connecting said first and second chambers;

a valve in said conduit for preventing flow through said conduit between said chambers; and an actuator for opening said valve to connect said first and second chambers, permitting said liquid to vaporize and permitting said vapor to pass through said conduit and into said sorbent, whereby the evaporation of said liquid serves to cool said first chamber, wherein said second chamber is in contact with a thermal insulator.

7. A method for cooling, comprising the steps of:
(a) providing a cooling device, comprising:
  (i) a first chamber containing a liquid wherein said first chamber has an interior surface provided with a wicking material for said liquid, wherein said wicking material for said liquid is a hydrophilic gel-forming polymer;
  (ii) a second evacuated chamber containing a sorbent for said liquid;
  (iii) a conduit connecting said first and said second chambers;
  (iv) a valve in the conduit preventing communication between said first chamber and said second chamber while said valve is closed; and
  (v) means for opening said valve to connect said first and said second chambers;
(b) opening said valve to permit communication between said first chamber and said second chamber, whereby the pressure in said first chamber is reduced, causing said liquid to boil, forming a vapor, which vapor is directed through said conduit into said second chamber; and
(c) removing vapor from said second chamber by collecting same in said sorbent until an equilibrium condition is reached, wherein said sorbent is substantially saturated or substantially all of the liquid originally in said first chamber has been collected in said sorbent.

8. A method for cooling, comprising the steps of:
(a) providing a cooling device, comprising:
  (i) a first chamber containing a liquid wherein said first chamber has an interior surface provided with a wicking material for said liquid, wherein said wicking material for said liquid is a hydrophilic gel-forming polymer; wherein said wicking material for said liquid consists of alkyl, aryl and amino derivative polymers selected from the group comprising vinylchloride acetate, vinylidene chloride, tetrafluoroethylene, methyl methacrylate, hexanedoic acid, dihydro-2,5-furandione, propenoic acid, 1,3-isobenzofurandione, 1 h-pyrrole-2,5-dione and hexahydro-2 h-azepin-2-one;
  (ii) a second evacuated chamber containing a sorbent for said liquid;
  (iii) a conduit connecting said first and said second chambers;
  (iv) a valve in the conduit preventing communication between said first chamber and said second chamber while said valve is closed; and
  (v) means for opening said valve to connect said first and said second chambers;
(b) opening said valve to permit communication between said first chamber and said second chamber, whereby the pressure in said first chamber is reduced, causing said liquid to boil, forming a vapor, which vapor is directed through said conduit into said second chamber; and (c) removing vapor from said second chamber by collecting same in said sorbent until an equilibrium condition is reached, wherein said sorbent is substantially saturated or substantially all of the liquid originally in said first chamber has been collected in said sorbent.

9. A method for cooling, comprising the steps of:
(a) providing a cooling device, comprising:
   (i) a first chamber containing a liquid wherein said first chamber has an interior surface lined with a wicking material for said liquid, wherein said wicking material has been electrostatically applied to the interior surface;
   (ii) a second evacuated chamber containing a sorbent for said liquid;
   (iii) a conduit connecting said first and said second chambers;
   (iv) a valve in the conduit preventing communication between said first chamber and said second chamber while said valve is closed; and
   (v) means for opening said valve to connect said first and said second chambers;
(b) opening said valve to permit communication between said first chamber and said second chamber, whereby the pressure in said first chamber is reduced, causing said liquid to boil, forming a vapor, which vapor is directed through said conduit into said second chamber; and
(c) removing vapor from said second chamber by collecting same in said sorbent until an equilibrium condition is reached, wherein said sorbent is substantially saturated or substantially all of the liquid originally in said first chamber has been collected in said sorbent.

* * * * *